United States Patent Office 3,249,638
Patented May 3, 1966

3,249,638
DESACETYLAMINO-N-METHYL COLCHICEINAMIDE
Georges Muller, Nogent-sur-Marne, and André Poittevin, Les Lilas, France, assignors to Roussel-UCLAF, Paris, France, a corporation of France
No Drawing. Filed Oct. 1, 1963, Ser. No. 312,891
Claims priority, application France, Dec. 21, 1962, 919,491; May 14, 1963, 934,782
1 Claim. (Cl. 260—571)

The invention relates to the novel product, desacetylamino N-methyl colchiceinamide having the formula

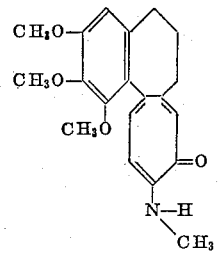

The invention further relates to novel antimitotic compositions and to a novel method of modifying mitosis. Desacetylamino N-methyl colchiceinamide possesses interesting biological properties, particularly an important antimitotic activity. It is useful for the treatment of myeloidal leukemia, cutaneous neoplasia, digestive tumors and carcinomas generally.

It is an object of the invention to provide the novel product, desacetylamino N-methyl colchiceinamide.

It is another object of the invention to provide a novel process for the preparation of desacetylamino N-methyl colchiceinamide.

It is a further object of the invention to provide novel antimitotic compositions.

It is an additional object of the invention to provide a novel method of modifying mitosis.

These and other objects and advantages of the invention will become obvious from the following detailed description.

The novel product of the invention, desacetylamino N-methyl colchiceinamide, has the structural formula

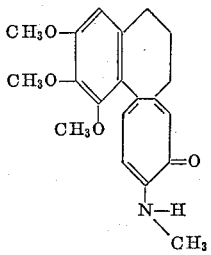

The process of the invention for the preparation of desacetylamino N-methyl colchiceinamide comprises reacting desacetylamino colchicine with diazomethane to form a mixture of desacetylamino colchicine and desacetylamino isocolchicine, separating the mixture by chromatography and reacting desacetylamino colchicine with monomethylamine in an aqueous medium at room temperatures to form desacetylamino N-methyl colchiceinamide.

The novel antimitotic compositions of the invention are comprised of desacetylamino N-methyl colchiceinamide and a major amount of a pharmacological carrier. The compositions can be prepared in the form of injectable solutions or suspension, prepared in ampules and in multiple dose flacons, in the form of sterile powders to be diluted with an appropriate solvent just before use, in the form of tablets and in the form of pomades made in the usual manner.

The novel method of the invention for modifying mitosis comprises administering an effective amount of desacetylamino N-methyl colchiceinamide. The said product can be administered orally, transcutaneously or by local application. The usual useful daily dosage is 1 to 25 mg. in the adult depending upon the method of administration.

In the following examples there are described several preferred embodiments to illustrate the invention. However, it should be understood that the invention is not intended to be limited to the specific embodiments.

EXAMPLE I.—PREPARATION OF DESACETYLAMINO N-METHYL COLCHICEINAMIDE

*Step A: Preparation of desacetylamino colchicine.*—6 gm. of desacetylamino colchicine obtained according to Shreiber et al. [Helv. Chim. Acta., 44, 540 (1961)] in solution in methylene chloride were treated with a solution of diazomethane in methylene chloride until an excess of reactant persisted. The excess of reactant was destroyed with several drops of acetic acid and the reaction mixture was evaporated to dryness under vacuum. The raw mixture obtained was subjected to chromatography through magnesium silicate and on elution with methylene chloride, desacetylamino colchicine having a melting point of 182–184° C. was obtained. This compound was crystallized from ethyl acetate.

By further elution of the column of magnesium silicate with a mixture of methylene chloride and ether (1:1), then with a mixture of methylene chloride and ether (1:1) containing 1% of methanol, desacetylamino isocolchicine having a melting point of 148° C. was obtained which compound was crystallized from ether.

*Step B: Preparation of desacetylamino N-methyl colchiceinamide.*—100 mg. of desacetylamino colchicine prepared in Step A were dissolved in 4 cc. of methanol containing 50% of water, 2 cc. of a 36% aqueous solution of monomethylamine were added to the reaction mixture and the reaction mixture was allowed to stand for a period of 16 hours at room temperature. Thereafter is was poured into water saturated with sodium chloride. The aqueous phase was extracted with methylene chloride and the methylene chloride extract was washed with water, then dried over sodium sulfate, filtered and evaporated to dryness under vacuum. By recrystallization from ether, 85 mg. of desacetylamino N-methyl colchiceinamide having a melting point of 210° C. were obtained.

The product crystallized in yellow prisms and was soluble in alcohol, acetone, benzene and chloroform, slightly soluble in ether and insoluble in water and dilute aqueous acids and alkalis.

*Analysis.*—$C_{20}H_{23}O_4N$; molecular weight=341.4. Calculated: C 70.36%, H 6.8%, N 4.1%. Found: C 70.6%, H 6.8%, N 4.2%.

This compound is not described in the literature.

*Pharmacological data*

The antimitotic activity of desacetylamino N-methyl colchiceinamide was studied according to the method of Jequier et al. (Arch. Int. Pharmacodyn., vol. 103, 1955, p. 243). This method is based on the fact that in rats the mitotic index of the marrow of the femoral bones (cells in mitosis/total number of cells) is the same as taken from diverse regions and on several areas of the same smear. The mitotic index is normally between 10 and 20 cells per 1000 cells.

After subcutaneous injection of an antimitotic colchicinic compound such as colchicine, the division of the cells is blocked at an intermediate stage of mitosis and the mitotic index is increased and obtains its maximum towards the sixth hour. The increase observed is a function of the dose administered and the correlation is clearly shown by a curve in the form of an S whose point of inflection is situated around the mitotic index of 100. The 100 antimitotic dose (DA 100) which is that dose which furnishes 100 mitosis for 1000 cells is a measure of the stathmocinetic activity of the product administered.

The method consisted of subcutaneously injecting groups of 2 or 3 rats with varying doses of the compounds to be studied with the volume injected always being 0.2 cc. per 100 gm. of body weight. The animals were sacrificed six hours after injection and the marrow of the femoral bones was separated. Smears of the marrow were prepared and colored with the May Grunwald-Giemsa stain. 1000 cells were counted on each smear and the DAM 100 was determined from graphs representing the mitotic index found as a logarithmic function of the dose.

The DAM 100 of desacetylamino N-methyl colchiceinamide was 0.4 mg./kg. while the DAM 100 of colchicine was 0.7 mg./kg. under identical conditions.

*Toxicity determination.*—The toxicity test was effected on mice of the Rockland strain weighing between 18 to 22 gm. by intraperitoneally administering to groups of mice with increasing doses of the products tested in aqueous suspension. The animals were held under observation for one week and the lethal dose ($DL_{50}$) for the products was determined by the graphic method of Miller et al. (Proc. Soc. Exp. Biol. Med., vol. 57, 1944, p. 261). From this, the therapeutic index or margin $$\left(\frac{DL_{50}}{DAM\ 100}\right)$$

was calculated. The results are summarized in Table I.

TABLE I

| Compound Studied | $DL_{50}$ in mg./kg. | Therapeutic Index |
|---|---|---|
| Desacetylamino N-methyl colchiceinamide | 50 | 125 |
| Colchicine | 2 | 2.8 |

The therapeutic index of desacetylamino N-methyl colchiceinamide is clearly more favorable than the therapeutic index of colchicine.

Various modifications of the compositions of the invention may be made without departing from the spirit or scope thereof, and it is to be understood that the invention is to be limited only as defined in the appended claim.

We claim:

Desacetylamino N-methyl colchiceinamide.

References Cited by the Examiner

UNITED STATES PATENTS

| | | | |
|---|---|---|---|
| 2,128,100 | 8/1938 | Neal | 260—571 |
| 2,141,687 | 12/1938 | Diir | 260—571 |
| 2,436,063 | 2/1948 | Adam et al. | 167—78 |
| 2,734,014 | 2/1956 | Bellet | 167—65 |
| 2,952,585 | 9/1960 | Heller | 167—78 |

OTHER REFERENCES

Bateman Farming, The Journal of Agricultural Process, October 1949, pp. 313–316.

CHARLES B. PARKER, *Primary Examiner.*

D. R. MAHANAND, R. V. HINES, *Assistant Examiners.*